United States Patent Office 3,427,383
Patented Feb. 11, 1969

3,427,383
SOLUBLE PTERIDINE COMPLEXES
Milton Lapidus, Rosemont, and Raymond Fagan, Radnor, Pa., assignors to American Home Products Corporation, New York, N.Y., a corporation of Delaware
No Drawing. Filed Aug. 13, 1965, Ser. No. 479,617
U.S. Cl. 424—101         5 Claims
Int. Cl. A61k 23/02, 27/00; C07g 7/00

ABSTRACT OF THE DISCLOSURE

This invention is directed to pteridine and pteridinecarboxamide complexes which are stable and soluble at the physiological pH range of about 7.0 to 7.4, to a method for their preparation, and to therapeutic compositions utilizing them.

---

This invention relates to new stable and soluble pteridine and pteridinecarboxamide complexes.

Heretofore, such compounds were generally administered subcutaneously as a suspension in 0.5% carboxymethyl cellulose. This practice is unsatisfactory from two standpoints. One, there frequently occurs at the site of the injection a granuloma containing nontransported material. Two, it is difficult to obtain a meaningful dose-response curve as a result of this poor physiological solubility.

The main object of this invention therefore is to provide pteridines and pteridinecarboxamides in a stable and soluble form at the physiological pH's (7.0–7.4).

The present invention, whereby the foregoing object is attained comprises forming at an acid pH ranging from 2.0 to 6.5 a complex consisting of a pteridine, or pteridinecarboxamide having at least two amino groups on the nucleus thereof, at least one of which is unsubstituted, and a high molecular weight polymer which complex is then stabilized at around pH 7.0. The existence of the claimed complexes, as opposed to the presence of a mere mixture, is evidenced by the absence of a Tyndall effect and by the fact that the complexes can be lyophilized.

An important advantage of the present invention is that it increases the maximum pH value at which pteridines and pteridinecarboxamides can be dissolved, without precipitating, by about two pH units.

The complex binding present in the claimed compounds remains intact even after adjustment of the solution to physiological pH's (7.0–7.4). This is in contrast to the finding that although acid alone will solubilize pteridines, solubility is reversed upon adjustment to pH 7.0–7.4. Polymeric vehicles which are effective in solubilizing pteridines and pteridinecarboxamides, and forming stable, soluble complexes at pH 7.0–7.4 are desoxyribose nucleic acid (DNA), ribose nucleic acid (RNA), gum acacia, pectin, and proteins.

The effectiveness of the vehicles mentioned above on solubilizing and stabilizing pteridines at pH 7.0–7.4 are dependent on a number of variables. One must consider: (1) the acid solubility of the pteridine; (2) the concentration of pteridine; (3) the pH of the vehicle; (4) the concentration of vehicle; (5) the pH rise of the vehicle as a result of the addition of pteridine; and (6) temperature.

In general, pteridines that can be acid-solubilized at pH's of 2 or above can be complexed with DNA or gum acacia and will remain in solution at pH 7.0–7.4. For each concentration and pH of vehicle there is a maximum concentration of pteridine that can be solubilized. For best results it is advantageous to store the solutions at 4° C. Lyophilization of the complexes eliminates the problem of stability since the dry powder can be reconstituted with distilled water when needed.

The types of active agents which can be complexed by the method of this invention include those as previously defined which have diuretic, natriuretic or antiviral activities, and which are disclosed, for example, in U.S. Patents 3,122,543; 3,122,544; 3,122,545; 3,122,546; 3,122,- 547; 3,133,923; 3,134,776; 3,138,592; 3,138,594; 3,138,- 595; and 2,975,180.

For the sake of brevity, however, the invention will be illustrated mainly by reference to 4,7-diamino-2-(p-chlorophenyl) - N - diethylaminoethyl - 6 - pteridinecarboxamide (WY4029).

EXAMPLE

Preparation of a soluble WY4029–DNA complex 10 g. of Na-DNA were dissolved by gradual addition to 90 ml. of vigorously stirred distilled water. After adjustment to pH 3.5 with dilute HCl and making up to 100 ml., a precipitate was removed by centrifuging for 15 minutes at 6000 G. 500 mg. of the above-mentioned compound WY4029 and 100 ml. of pH 3.5 DNA solution were triturated at room temperature in a Potter-Elvehjem glass homogenizer until complete solubility was attained. The solution was slowly adjusted to pH 7 by the addition of dilute NaOH under conditions of vigorous stirring. A slight colloidal precipitate was removed by sterile filtration through a .45µ Millipore filter. The sterile solution was stored at 4° C. or lyophilized.

The WY4029–DNA complex is a soluble, stable dosage form that can be easily administered subcutaneously. In particular, the DNA complex did not form granulomas in animals and was transported away from the subcutaneous site of injection. The usual toxic effect encountered when pteridine suspended in CMC is administered, such as granuloma, cysts, or tissue necrosis was eliminated. Not to be underestimated is the fact that the dose necessary to show an antiviral activity was reduced 10×.

The following table shows the solubility in mcg./ml. of water of various complexes prepared as described in the above example but using various concentrations of different complex-forming agents together with the pteridine. In arriving at the figure shown in the table a solubilizing test system consisting of 20 ml. of water was used. To this system was added enough of the complex forming agent to give the concentration appearing in the first column. The pH of the resulting solution was then determined conventionally and the amount of the compound indicated in the next column was added, the pH again being measured. Finally the system was adjusted to pH 7.0. The solubility was then determined by spectrophotofluorometric analysis. In .1 N sulfuric acid, the fluorescence of the compound is activated at a wavelength of 390 mµ and a measurement of the fluorescence is made at a wavelength of 445 mµ. Solutions of known concentration are used to obtain a standard curve.

TABLE

| Solubilizing Test System (20 ml.) | | | Amount of WY4029 added | | Solubility of WY4029 in complex pH 7.0, mcg./ml. |
|---|---|---|---|---|---|
| Vehicle | Conc., percent | pH | Mg. | Resulting pH | |
| Egg Albumin | .6 | 5.32 | 200 | 6.48 | 190 |
| RNA-Na | .6 | 7.58 | 200 | 8.45 | 850 |
| DNA-Na | .6 | 5.60 | 200 | 7.2 | 1,650 |
| Pectin | .6 | 3.9 | 200 | 6.55 | 1,800 |
| Calf Serum | 100 | 7.97 | 50 | 7.35 | 200 |
| Human Serum | 100 | 7.68 | 50 | 7.26 | 205 |
| DNA-Na | .5 | 5.55 | 50 | 6.68 | 1,050 |
| DNA-Na | 10.0 | 5.05 | 50 | 5.13 | 2,350 |
| DNA-Na | 20.0 | 4.9 | 300 | 5.58 | 6,600 |
| DNA-Na | 5.0 | 2.0 | 300 | 3.2 | 10,000 |
| DNA-Na | 5.0 | 2.5 | 300 | 4.0 | 10,875 |
| DNA-Na | 5.0 | 3.0 | 300 | 4.6 | 10,750 |
| DNA-Na | 5.0 | 8.0 | 300 | 7.91 | 1,250 |
| RNA | .5 | 3.2 | 50 | 3.4 | 850 |
| RNA | 10.0 | 2.45 | 50 | 2.4 | 1,470 |
| RNA | 20.0 | 2.35 | 300 | 2.4 | 1,800 |
| RNA | 5.0 | 6.5 | 200 | 6.79 | 1,330 |
| Human Albumin V | 2.5 | 4.9 | 200 | 5.58 | 1,400 |
| | 15.0 | 4.9 | 200 | 5.35 | 8,350 |
| Bovine Albumin V | 5.0 | 3.0 | 100 | 3.6 | 805 |
| | 5.0 | 7.0 | 100 | 7.15 | 125 |
| Bovine Serum Albumin | 5.0 | 5.1 | 400 | 5.8 | 1,600 |
| | 20.0 | 5.1 | 400 | 5.72 | 5,950 |
| Gum Acacia | .5 | 5.2 | 50 | 6.93 | 150 |
| | 40.0 | 4.25 | 300 | 5.48 | 5,950 |
| | 5.0 | 2.0 | 200 | 3.25 | 3,400 |
| | 5.0 | 7.0 | 200 | 7.1 | 318 |
| | 7.5 | 3.0 | 400 | 5.79 | 270 |
| | 15.0 | 3.0 | 400 | 4.95 | 18,800 |
| | 2.5 | 3.5 | 400 | 6.30 | 32.5 |
| | 7.5 | 3.5 | 400 | 5.99 | 5,600 |
| | 15.0 | 3.5 | 400 | 5.70 | 10,800 |
| | 2.5 | 3.0 | 66 | 3.8 | 3,800 |
| | 12.5 | 3.0 | 366 | 4.69 | 16,000 |

Similar results are obtainable with the following compounds:

2,4,7-triamino-6-phenylpteridine;
4,7-diamino-2-(m-chlorophenyl)-N-[2-(diethylamino)-ethyl]-6-pteridinecarboxamide;
4,7-diamino-2-(m-chlorophenyl)-N-[4-(dimethylamino)butyl]-6-pteridinecarboxamide;
4,7-diamino-N-(4-dimethylaminobutyl)-2-phenyl-6-pteridinecarboxamide; and
4-amino-N-(2-methoxyethyl)-7-(2-methoxyethylamino)-2-phenyl-6-pteridinecarboxamide.

What is claimed is:

1. A stable and water soluble complex composed of a pteridine or a pteridinecarboxamide having at least two amino groups on the nucleus thereof, at least one of these groups being unsubstituted, with desoxyribose nucleic acid, ribose nucleic acid, gum acacia, or pectin.

2. A process for making a stable, water soluble pteridine complex or pteridinecarboxamide complex which comprises treating a pteridine or pteridinecarboxamide having at least two amino groups on the nucleus thereof, at least one of these groups being unsubstituted, in aqueous acid media with desoxyribose nucleic acid, ribose nucleic acid, gum acacia, pectin, human albumin V, bovine albumin V, bovine serum albumin, calf serum or human serum, neutralizing the resulting solution, then increasing the pH to about 7.0 to 7.4, and recovering the complex so formed from said solution.

3. A complex composed of one of the following active components:
2,4,7-triamino-6-phenylpteridine; 4,7 - diamino - 2 - (m-chlorophenyl) - N - [2 - (diethylamino) - ethyl] - 6-pteridinecarboxamide; 4,7 - diamino - 2 - (m - chlorophenyl) - N - [4 - (dimethylamino)butyl] - 6 - pteridinecarboxamide; 4,7-diamino-N-(4-dimethylaminobutyl) - 2 - phenyl - 6 - pteridinecarboxamide; and 4-amino - N - (2 - methoxyethyl) - 7 - (2 - methoxyethylamino) - 2-phenyl-6-pteridinecarboxamide; and one of the following:
desoxyribose nucleic acid, ribose nucleic acid, and gum acacia.

4. A therapeutic composition having a pH of about 7.0 to 7.4 consisting of water and a complex as defined in claim 3.

5. A therapeutic composition having a pH between about 7.0 to 7.4 and consisting of water and a complex composed of:
(A) one of the members selected from the class consisting of 2,4,7-triamino-6-phenylpteridine; 4,7-diamino - 2 - (m - chlorophenyl) - N - [2 - (diethylamino)-ethyl]-6-pteridinecarboxamide; 4,7-diamino-2 - (m - chlorophenyl) - N - [4 - (dimethylamino)butyl]-6-pteridinecarboxamide; 4,7-diamino-N-(4-dimethylaminobutyl - 2 - phenyl - 6 - pteridinecarboxamide; and 4 - amino - N - (2 - methoxyethyl) - 7-(2-methoxyethylamino) - 2 - phenyl - 6 - pteridinecarboxamide, and
(B) one of the members selected from the class consisting of desoxyribose nucleic acid, ribose nucleic acid, and gum acacia, human albumin V, bovine albumin V, bovine serum albumin, calf serum and human serum.

References Cited

Fujimori: Chem. Abstracts, vol. 53, No. 17, Sept. 10, 1959, p. 16243a.

LEWIS GOTTS, *Primary Examiner.*

ETHEL G. LOVE, *Assistant Examiner.*

U.S. Cl. X.R.

260—209, 209.5, 211.5, 112; 424—177, 180, 251